United States Patent
Daugela et al.

(10) Patent No.: US 9,953,673 B2
(45) Date of Patent: Apr. 24, 2018

(54) HEAD TO MEDIA INTERFACE MONITORING

(71) Applicant: Seagate Technology LLC, Cupertino, CA (US)

(72) Inventors: Antanas Daugela, Bloomington, MN (US); Jon D. Trantham, Chanhassen, MN (US); Scott E. Ryun, Victoria, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/200,439

(22) Filed: Jul. 1, 2016

(65) Prior Publication Data

US 2018/0005657 A1   Jan. 4, 2018

(51) Int. Cl.
*G11B 21/02* (2006.01)
*G11B 5/60* (2006.01)

(52) U.S. Cl.
CPC .......... *G11B 5/6076* (2013.01); *G11B 5/607* (2013.01)

(58) Field of Classification Search
CPC ..... G11B 45/6029; G11B 5/607; G11B 27/36; G11B 5/012; G11B 2220/20; G11B 5/02; G11B 5/6005; G11B 5/59633; G11B 5/54
USPC ..................................................... 360/69, 75
See application file for complete search history.

(56) References Cited

U.S. PATENT DOCUMENTS

| | | | |
|---|---|---|---|
| 6,935,925 B1 | 8/2005 | Agrawal et al. | |
| 7,016,139 B2 | 3/2006 | Baumgartner et al. | |
| 7,489,466 B2 | 2/2009 | Knigge et al. | |
| 7,518,813 B1 | 4/2009 | Egan et al. | |
| 7,742,255 B2 | 6/2010 | Daugela et al. | |
| 7,885,025 B2 | 2/2011 | Eppler et al. | |
| 8,059,357 B1 | 11/2011 | Knigge et al. | |
| 9,001,452 B2 * | 4/2015 | Daugela | G11B 5/6029 360/27 |
| 2005/0057834 A1 | 3/2005 | Hirano et al. | |
| 2008/0158704 A1 | 7/2008 | Knigge et al. | |
| 2010/0157485 A1 | 6/2010 | Narayanan et al. | |
| 2011/0043938 A1 | 2/2011 | Mathew et al. | |
| 2012/0050907 A1 | 3/2012 | Haapala | |

(Continued)

OTHER PUBLICATIONS

Daugela A., Nagarajan S., Boutaghou Z.E., (2006), Ultra Sensitive In-Situ Acoustic Characterization System for HDD HDI Defectoscopy and Particles Registration, Proc. of ASME/JSME Joint Conference on Micromechatronics for Information and Precision Equipment (MIPE 2006) Santa Clara, CA, Jun. 21-23, 2006.

(Continued)

*Primary Examiner* — Nabil Hindi
(74) *Attorney, Agent, or Firm* — Holzer Patel Drennan (57) ABSTRACT

A storage device disclosed herein includes a transducer head with a proximity sensor that generates head-disc proximity signals, a digitizer configured to convert the analog proximity signals from the proximity sensor to digitized sample data, a discrete wavelet transformation (DWT) module configured to analyze the digitized sample data by performing an enhanced DWT on the digitized sample data to generate DWT coefficients, and a modal filter configured to determine dominant head-disc interference (HDI) modes for a transducer head by analyzing the DWT coefficients.

14 Claims, 6 Drawing Sheets

(56) References Cited

U.S. PATENT DOCUMENTS

2012/0287529 A1 11/2012 Lueng et al.
2014/0268407 A1 9/2014 Daugela et al.

OTHER PUBLICATIONS

Daugela A., Riddering J.W., Nagarajan S., Boutaghou Z.E. (2008), Passive Acoustic Monitoring of Head Disc Interface Interactions, Proc. of ASME Information Storage and Processing Systems Conference, 2008, Jun. 16-17, 2008, Santa Clara, CA, USA.

Daugela A., Tadepalli S.,(2011) Drive Level Acoustic Defectoscopy for Head Disc Interface (HDI) Integration and Manufacturing, Proc of ASME Information Storage and Processing Systems Conference, Jun. 13-14, 2011, Santa Clara, CA, USA.

Daugela A, Nagarajan S, Boutaghou ZE (2007) Ultra sensitive in-situ acoustic characterization system for HDD Head Disc Interface defectoscopy. J Microsyst Technol. 13 (8-10): 1185-1191.

Daugela A., Riddering J.W., Boutaghou ZE, (2010) Passive acoustic monitoring of head disc interface interactions. J Microsyst Technol. 16 (1): 77-83.

Daugela A., Tadepalli S.,(2012) Drive Level Acoustic Defectoscopy for Head Disc Interface (HDI) Integration and Manufacturing. J Microsyst Technol. 18(9-10):1425-1430.

Daugela A, Trantham JD, Ryun SE, Tadepalli S (2014) Multi-resolution HDD contact detection technique for low SNR. J Microsyst Technol 20(8-9):1597-1603.

Knigge B, Talke FE (2001) Slider Vibration Analysis at Contact Using Time-Frequency Analysis and Wavelet Transforms. J of Tribology 123(3):548-554.

Matthes L.M., Knigge B.E., Talke F.E. (2014) "Head-disk proximity sensing using contact sensors in Hard Disk Drive," IEEE Trans. on Magn. (50) 11.

Sweldens, W. (1998), The Lifting Scheme: a Construction of Second Generation of Wavelets, SIAM J. Math. Anal., 29 (2), pp. 511-546.

Tang Z, Talke F.E (2015) "Investigation of slider flying characteristics and frequency response in helium-air gas mixtures," Microsyst. Technol. (21) 4.

Vetterli MV, Kovacevic J. (1995) Wavelets and Subband Coding. Prentice Hall, USA.

\* cited by examiner

HEAD TO MEDIA INTERFACE MONITORING

BACKGROUND

Disc drives are data storage devices that store digital data in magnetic form on a rotating storage medium called a disc. Each surface of a disc may be divided into thousands of concentric circular tracks. Each track is further broken down into contiguous sectors. Each of the surfaces in a disc drive typically has one or more recording heads in close proximity to the disc surface for reading and writing data to the disk surface. Data is accessed by moving the heads between the inner and outer parts of the disc by an actuator assembly and waiting for the desired sector to rotate beneath the head. Over time, the head to media surface interface may change, adversely affecting the reliability or long-term performance of the disc drive. The capability to monitor the head to media surface interface and perform corrective action if it changes can help mitigate head to media interface degradation.

SUMMARY

A storage device disclosed herein includes a transducer head with a proximity sensor that generates head-disc proximity signals, a digitizer configured to convert the analog proximity signals from the proximity sensor to digitized sample data, a discrete wavelet transformation (DWT) module configured to analyze the digitized sample data by performing an enhanced DWT on the digitized sample data to generate DWT coefficients, and a modal filter configured to determine dominant head-disc interference (HDI) modes for a transducer head by analyzing the DWT coefficients.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

BRIEF DESCRIPTION OF THE DRAWINGS

A further understanding of the nature and advantages of the present technology may be realized by reference to the figures, which are described in the remaining portion of the specification.

DETAILED DESCRIPTION

Advancements in processing power and high-speed electronics within the controller electronics of a hard disc drive enable new ways to detect modulation modes of the storage device recording head's air bearing surface (ABS). The changes of these modes over time allow for the monitoring of head-disk-interface health. Specifically, the ability to perform high speed digitization of sensor analog signals, to capture those signals in memory, and to perform analytical post processing allows for health monitoring and fault prediction of the head disk interface.

Implementations of the present technology are disclosed herein in the context of a disc drive system. However, it should be understood that the technology is not limited to a disc drive system and could readily be applied to other data storage devices as well as to other tribological and technology systems. Disc drive systems use a transducer head including a write sensor, a read sensor, etc., that reads and writes data from storage media. Such a transducer head may be affixed to an actuator assembly. The actuator assembly moves the transducer head in a lateral arch, with the head in close proximity to the surface of the media. The distance between the transducer head and the surface of the storage media is referred to as the fly height or the flying height. If the fly height is too high, it results in poor quality of data reading and writing, on the other hand, if the fly height is too low, it results in the potential for the transducer head to contact the surface of the storage media and to wear or become damaged. Therefore, the fly height of the transducer head is calibrated to determine the proper tradeoff between the signal quality and potential for physical damage to the transducer head. In one implementation of a disc drive, the fly height is actively controlled by a signal that changes the proximity of a close point of the transducer head to the media surface. For example, this control is to embed an electrical resistive heater in the transducer head that will cause a close point of the transducer head to protrude closer to the disk surface, depending upon the current through the heater.

In order to ensure a proper head-disc proximity/spacing during read or write operation a calibration determining the actual contact point may need to be performed. This calibration involves synchronized operation of the thermal protrusion devices and proximity sensors that are controlled by microprocessor/DRAM.

It can take many revolutions of a disc (e.g., 16-25 revolutions) in order to calibrate a disc drive system. This can cause damage to a transducer (e.g., a transducer head) and/or to the disc. Such damage can occur due to the transducer head and the disc coming into contact with one another during such a calibration. In certain implementations described herein, the amount of time that a transducer head and a disc are in contact with one another during calibration can be significantly reduced. Such an implementation can be accomplished by pushing a transducer head closer and closer to a disc and taking data samples from a proximity sensor.

One example of a proximity sensor is a device located next to the transducer head that will exhibit a change in resistance depending upon its proximity and degree of contact with a disc surface. The change in resistance can be caused by the decreased temperature of the proximity sensor through heat convection into the disc as it approaches contact, followed by increased temperature of the proximity sensor from friction with the disc surface. Thus, the proximity sensor generates data samples that are based on the proximity of the sensor to the disc surface. The change in resistance can be measured in the form of current flowing through the proximity sensor, the voltage across the proximity sensor, or a change in some other parameter of the proximity sensor. For example, an alternate proximity sensor might be capacitive based, and spacing might be detected as a capacitance between the sensor and the disk. In another example, the proximity sensor may be acoustically based, and the spacing may be determined as a sound volume or pressure. In yet another example, the sensor may be the reader element of the recording head itself, and the spacing may be detected by the spectral energy ratios of the read-back signal.

The data samples may be in form of digital data representing the sensed parameter, such as values representing resistance, capacitance, voltage, current, acoustical amplitudes, etc. In one implementation, analog signals are converted to a large number of digital data values and sent to a processor, such as a processor used by the disc controller for further processing. For example, the processor may analyze patterns within the digital data samples, etc.

An ADWT processor (or kernel) may analyze patterns within the digital data samples. For example, the processor can use a mathematical processing technique referred to as adaptive discrete wavelet transforms (ADWT) to process the digital data samples provided by the proximity sensor to generate DWT coefficients. The HDI spacing may vary at different frequencies due to vibrational modes of the mechanical components of the system. For example, the recording head may experience a spacing modulation at one frequency due to torsional vibration mode of the suspension and a different spacing modulation frequency due to the bending mode of the suspension. These frequencies or their amplitudes may change as the mechanics of the system change, for example due to wear or contamination. A modal filter or an estimator may use the DWT coefficients generated by the ADWT processor to determine estimates of various dominant head disc interference (HDI) modes, including their frequency and amplitude. The dominant HDI modes are collected and stored in a persistent HDI modal data storage structure.

Figure 1:
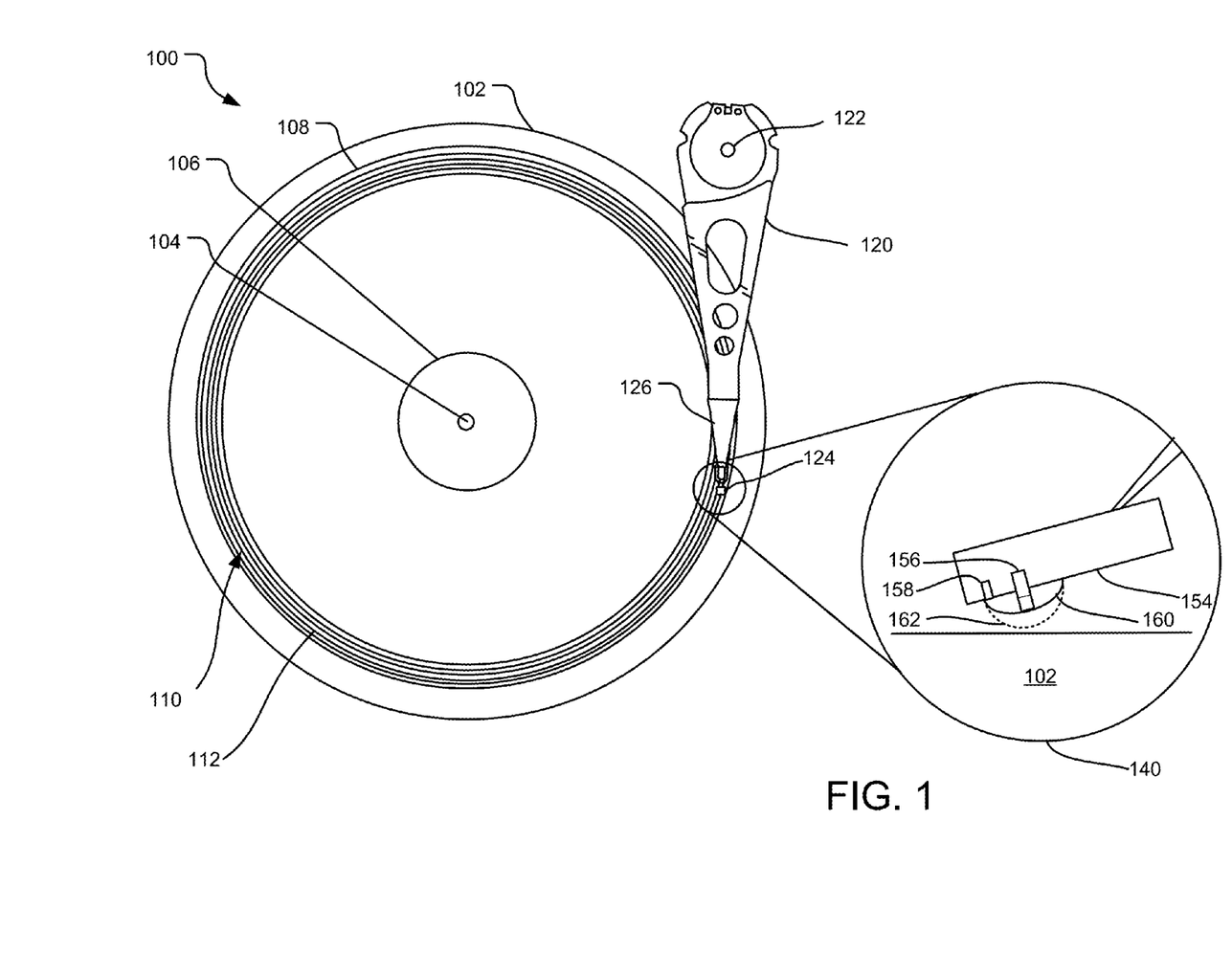
FIG. 1 illustrates an example disc drive system illustrating head to media interface monitoring in one implementation.

FIG. 1 illustrates an implementation of an example of a disc drive 100 utilizing various methods and systems for determining dominant head-disc interference (HDI) modes for a transducer head 124 by analyzing samples of a monitored signal [s(t)] collected from a head-to-media proximity sensor. It should be understood, however, that the described methods and systems may also be employed with other tribological systems and other types of storage media, including continuous magnetic media, bit-patterned media, etc.

The disc drive 100 includes a disc 102 that rotates about a spindle center or a disc axis of rotation 104 during operation. The disc 102 includes an inner diameter 106 and an outer diameter 108 between which are a number of concentric data tracks 110. Information may be written to and read from the disc 102 in different data tracks 110. The transducer head 124 is mounted on an actuator assembly 120 by a spring suspension 126 at an end distal to an actuator axis of rotation 122. The transducer head 124 flies in close proximity above the surface of the disc 102 during disc operation. The actuator assembly 120 rotates during a seek operation about the actuator axis of rotation 122 positioned adjacent to the disc 102. The seek operation positions the transducer head 124 over a target data track of the data tracks 110.

The exploded view 140 illustrates a side view of the transducer head 124 (not to scale) as an enlarged head 154. In one implementation, the transducer head 154 progresses along a target data track as the disc 102 rotates in a substantially circular trajectory. The transducer head 154 includes a thermal expansion device 156 that can expand or contract based on energy provided to it in the form of electric current, optical energy, etc. In one implementation, the thermal expansion device 156 is positioned behind a write pole (not shown) of the transducer head 154. Alternatively, the thermal expansion device 156 may also be implemented at other locations in the transducer head 154.

The expansion of the thermal expansion device 156 moves a close point of a transducer head 154 from a position 160 (shown by solid line) to position 162 (shown by dashed line). Similarly, the contraction of the expansion device 156 moves the close point from the position 162 to the position 160. The transducer head 154 also includes a proximity sensor 158, such as a thermal-resistance temperature sensor, that allows proximity readings to be indirectly obtained so that one can determine when the transducer head 154 contacts the surface of the disc 102. The proximity sensor 158 can determine a spacing between the transducer head 154 and the recording medium, for example, by detecting a voltage across a resistance effected by the spacing from the recording medium. Alternatively, the spacing can be detected based on some other sensing, such as changes in the read-back signal of a read sensor (not shown) of the transducer head, capacitance of a capacitive sensor, etc.

In one implementation of a fly-height calibration routine, the transducer head's close point can be driven towards the media surface until a gentle head-to-media contact is created. This can be done by using the thermal expansion device 156 to push the close point of the transducer head 154 closer to the media surface. Thus, the active fly height clearance of the transducer head 154 relative to the disc can be set by first establishing contact between the close point of the transducer head 154 and the disc surface and then by backing off the close point of the transducer head 154 from the contact point. The active fly height can be controlled by changing the amount of thermal expansion caused by the heater so that the close point of the transducer head is pushed out toward the recording medium or allowed to retract away from the recording medium. The adjustment of the active fly height can increase drive life and improve bit-error-rate performance.

Accurate Contact Detection (CD) and HDD's Head Disc Interface (HDI) monitoring routines are useful for optimizing recording subsystem performance and preventing head damage and drive reliability degradation due to head-disk contact. During the HDI active clearance calibration routine, the transducer head 154's close point is driven until gentle head-media contact by utilizing the thermal expansion (protrusion) device 156, such as a writer/reader heater. Thus, the active flying height clearance can be set correctly by finding contact and then by backing-up the CP thermal protrusion to optimize the tradeoff between good BER performance and drive life.

The implementation disclosed herein allows for a reduction in contact time between a head and a disk can be facilitated by the expeditious gathering of large amounts of data samples for later processing and the use of adaptive discrete wavelet transforms (ADWT) to process the data samples to generate DWT coefficients. The DWT coefficients are used by a modal filter to determine dominant HDI modes (or frequency modes) for the transducer head 154. Such implementation may be used to decrease the calibration time when a disc drive is initially manufactured and thereby reduce the wear on the head and disk, and increase manufacturing throughput. In an alternative implementation, a self-adjusting contact detection may be used, which can perform a fast on-demand type measurement when a disc drive is first manufactured as well as at later points in time when the disc drive is used in the field. In such an implementation, the fly height settings are adjusted dynamically based on the on-demand contact detection measurements and such dynamic adjusting allows the disc drive to be re-calibrated after it is sold. For example, if the bit-error-rate (BER) performance of the drive degrades, the disc drive can be recalibrated in the field. This helps to improve the lifetime and/or the performance of the disc drive system.

In one implementation, an adaptive discrete wavelet transforms (ADWT) process may be used by a hard disc drive processor for head-disc proximity detection. The ADWT technique may be used with a variety of signal sources. For example, data samples from other sensors or available signals, such as head-signal amplitude modulation, head-signal harmonic ratios, and acoustical sensors can be used for head-disc proximity detection. For example, in a heat-assisted magnetic recording (HAMR) hard disc drive, a signal representing reflected laser power is used by the processor as an input signal for head-disc proximity detection.

One challenge in working with ADWT is the collection and processing of a significantly large amount of data-points (data samples) that are sampled, without adding significant hardware costs to the disc drive's electronics. This challenge has been addressed by incorporating an internal digitizer within the drive's controller ASIC. Samples from the digitizer can be automatically stored in DRAM by attaching the digitizer through DMA (direct memory addressing) circuitry. Alternately, the digitizer can be connected and sampled externally by attaching the digitizer to the drive's controller ASIC utilizing a Synchronous Serial Interface (SSI). An SSI interface operates at a very high data transmission rate. Therefore, a processor configured with an SSI interface is able to receive a stream of data samples output from a sampling process. The samples may be stored for later processing, e.g., in DRAM.

For example, a processor can sample analog data from a proximity sensor as a thermal expansion device causes a close point of a transducer head to move closer to a disc surface. These analog samples can be converted by a digitizer (e.g., an analog to digital converter (ADC)) and stored in memory. The data does not need to be processed (e.g., via ADWT calculations) while the samples are collected. Rather, the data may be stored to the memory on the drive and then processed at a later point in time. Such memory storing the data samples may be implemented on the disc drive, on a host device, or any other location that can be accessed by the processor for processing at a high data transfer rate. Such storing of data samples for later processing reduces the real-time demands on the processor during data collection so that the processor can merely obtain the samples.

Figure 2:
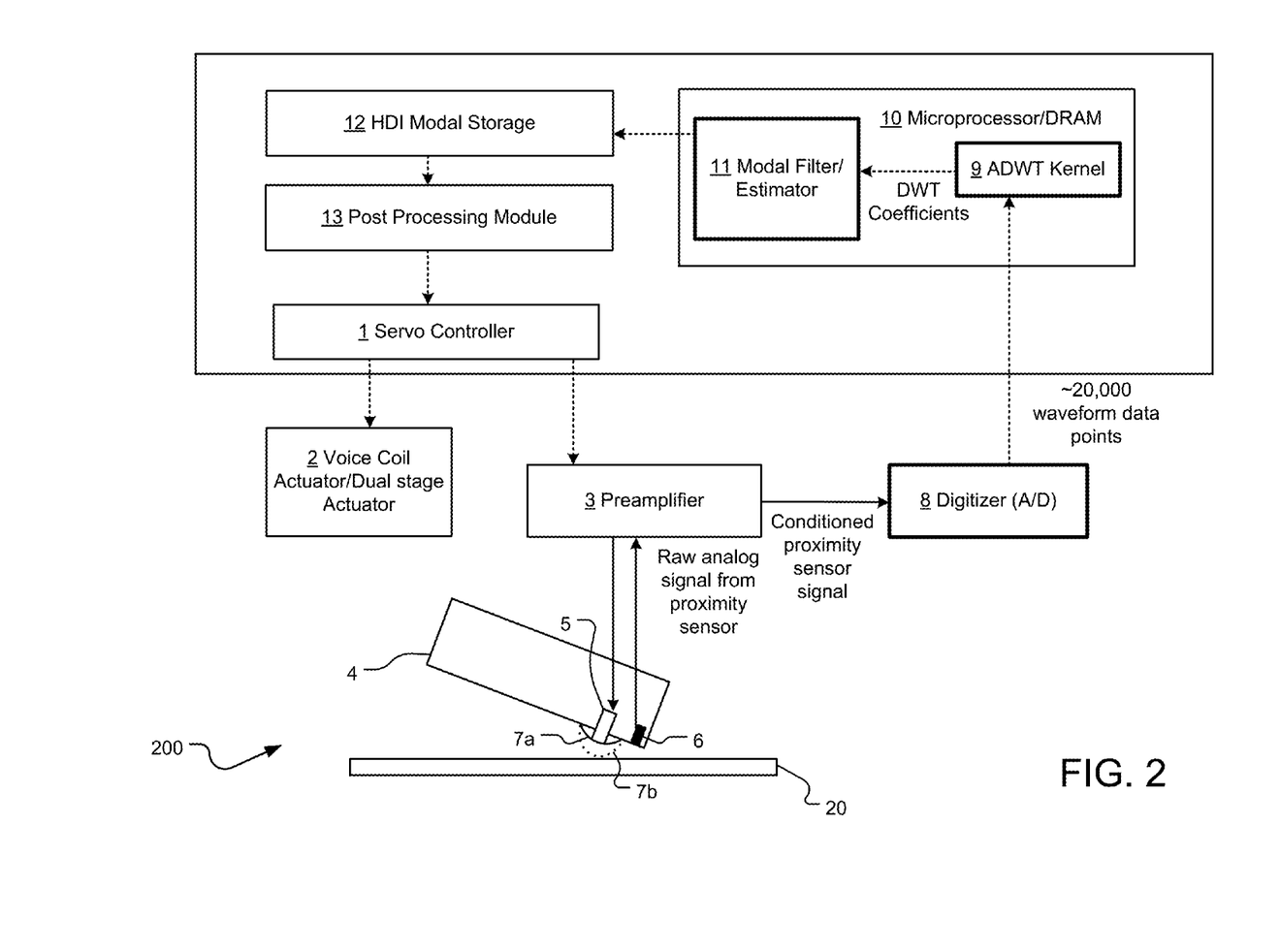
FIG. 2 illustrates an example block diagram of a circuit for performing head to media interface monitoring in one implementation.

Referring to FIG. 2, an example of a circuit in one implementation can be seen. A servo controller 1 is shown controlling a voice coil and dual stage actuator 2, such as a piezoelectric actuator. A preamplifier 3 is used to convert servo controller commands into analog inputs/outputs for a transducer head 4. The transducer head 4 includes one or more thermal expansion devices 5 to move a close point of the transducer head 4 between positions 7a and 7b. The close point is the position on the transducer head 4 that makes contact with the disc 20 when a contact occurs.

Once a close point setting for the transducer head 4 is determined a desired active fly height setting can be selected. An active fly height setting can be selected, for example, by first causing a close point of the transducer head 4 to establish a contact with the recording medium and then backing off the close point of the transducer head 4 by a predetermined amount (e.g. by a fixed number of nanometers of spacing, etc.).

A proximity sensor 6 is shown in FIG. 2 as being integrated into the transducer head 4 and used to sense, for example, head to disc interface (HDI) modulation changes during the contact. The proximity sensor can be a resistive element that changes in resistance due to heat caused by contact of the proximity sensor with the disc. Alternatively, the proximity sensor 6 may detect the contact between the close point of the transducer head and the media surface using other methods, such as change in capacitance, reflected laser power, etc. A proximity signal [s(t)] collected from the proximity sensor 6 is amplified by the preamplifier 3 and input to a digitizer 8.

The digitizer (analog to digital converter (ADC)) 8 may be used to convert the amplified proximity signal [s(t)] from the proximity sensor 6 and to output the data to an adaptive discrete wavelet transform (ADWT) module (or kernel) 9 in the processor 10. In one implementation, the digitizer 8 is an internal analog to digital converter that is part of the hard drive's controller ASIC. In an alternate embodiment, it is an external digitizer, such as a Texas Instruments ADS7887. The processor 10 may include memory, embedded or external, such as SRAM or DRAM. The ADWT module 9 may either immediately process the data it receives, such as the digitized waveform samples, or it may store the data in memory, such as DRAM memory for post-processing. Storing the data samples and then processing the data samples at a later point in time, the load on the processor 10 is reduced during the data collection phase.

In one implementation, the ADWT module 9 can process the data samples, such as the digitized waveform samples to generate DWT coefficients using an ADWT process. A modal filter/estimator block 11 determines the dominant head-disc interference (HDI) modes for the transducer head 4 by analyzing the DWT coefficients.

In one implementation, the following sequence of steps can be used with the circuit in FIG. 2 for contact detection. First, the servo controller 1 issues a command to the thermal expansion device 5 via the preamplifier 3. The preamplifier 3 generates an appropriate amount of energy to be sent to the thermal expansion device 5. The thermal expansion device 5 pushes the close point 7a of the transducer head closer to the disc surface as shown by the protruded close point shape 7b. The proximity sensor 6 can be synchronized with the energy burst delivery to the thermal expansion device 5. The preamplifier 3 acquires the signals or the data samples generated by the proximity sensor 6 using an analog signal preconditioning circuit (not shown). In one implementation, the analog signal preconditioning circuit can amplify and band-limit the received signal by using a band-pass filter with its bandwidth tuned to capture head to disc-interface modulation.

The digitizer 8 digitizes the conditioned analog signals from the proximity sensor 6. In one implementation, the digitizer 8 can sample the conditioned analog signal at a high sample rate, such as for example, at a sample rate of one million samples per second or faster. The digitizer 8 may generate an output signal of 8 bits or greater per sample. Sampling can begin at the same time as the thermal expansion device 5 is activated. The ADWT module 9 performs ADWT on the sampled data points. This ADWT operation results in generation of DWT coefficients. The DWT coefficients are sent to the modal filter block 11, which can apply programmed logic rules in order to generate dominant head-disc interference (HDI) modes for a transducer head by analyzing the DWT coefficients.

In one implementation, the modal filter block 11 generates n dominant HDI mode estimates. These estimates are stored in an HDI modal data storage block 12. A post-processing block 13 analyzes the n dominant HDI mode estimates to determine head to disc contact. If no contact is detected, a new command is issued to the servo controller 1 to step up the thermal expansion energy. The post processing block 13 may also perform various HDI modal monitoring interpretations according to one or more selected criteria, such as for example, head/media proximity signatures, lube-interaction-induced modal shifts etc. This effect can be seen in below in FIG. 5 where rather stationary modes at 110 kHz and 220 kHz are seen to be shifting at and after a protrusion step 61. The results obtained following given criteria are stored in HDI modal data storage (12) and used in realizing HDI diagnostics and head/media proximity sensing, corrective actions (which include possible fly-height adjustment, head clean up, failure prediction, etc.).

Digitizer 8 can digitize an analog proximity probe signal at a sampling rate of greater than or equal to 1 million samples per second with at least eight bits resolution, for example. The digitizer's 8 capturing operation of a large number of data points can be synchronized with the operation of the thermal expansion device 5. In one implementation, the ADWT module 9 is a discrete wavelet transform (DWT) calculator enhanced by nonlinear functions and statistical framework and implemented by logic circuitry, such as a processor within a hard disc drive controller.

The ADWT module 9 shown in FIG. 2 can be implemented in three stages. A first stage can perform an iterative DWT decomposition, where a signal is decomposed into sub-levels and expressed by DWT coefficients. A no redundant DWT representation of a monitored signal s(t) in time domain t can be expressed as follows:

$$s(t) = \sum_{k=-\infty}^{\infty} \sum_{l=m}^{M} d(k,l) 2^{-k/2} \psi(2^{-k} t - l) \quad (1)$$

where ψ is a base function. Discretized dilation takes values of the form 2k, where k is an integer. At any dilation 2k, the translation parameter can take values of the form 2kl, where l is an integer. The actual values of the (k,l) are discrete wavelet or DWT coefficients W(a,b):

$$W(a,b) = \Phi[s(t)], \Phi[s(t)] \epsilon a = 2^k, b = 2^k l \quad (2)$$

This corresponds to sampling coordinates (a, b) on the so-called dyadic sampling grid, where consecutive values of discrete scales and corresponding sampling differs by a factor of two, thus enabling efficient implementation via computer code. The two-dimensional sequence d(k, l) is referred to as the discrete wavelet transform. Frequency and time can be assigned for the dilation and translation operations making this mathematical method of practical use.

The DWT coefficients W(a,b) are input to the modal filter block 11. In order to identify HDI dominant modes the Modal Filter/Estimator 11 first determines the largest DWT coefficients W(a,b) obtained at every step of signal decomposition, i.e., dilation k and translation l:

$$W_{max(k,l)} = \text{Max } W(a,d) \quad (3)$$

Next, DWT coefficient values are converted into approximate modal frequencies $f_{approx}(k, l)$ as follows:

$$f_{approx,(k,l)} = \frac{l(W_{maxkl}) f_{pseudo}(l)}{2\pi N_l}, N_l = 2^k \quad (4)$$

Here, $I_{(Wmax\ k,l)}$ is an index of the largest DWT coefficients at a given step of dilation k and translation l; $f_{pseudo}(l)$ is a pseudo frequency at level l of translation which depends on a wavelet approximation center frequency fc and actual digital sampling period $t_{samp}$:

$$f_{pseudo(l)} = \frac{f_c}{l t_{samp}} \quad (5)$$

Thus, For a DB4 wavelet fc=0.714285714285714.

A modal estimate Γ, which is a single parameter describing HDI modulation intensity can be derived by summing all DWT coefficients for every thermal protrusion step as follows:

$$\Gamma = \sum_{k=1}^{K} \sum_{l=1}^{L} W_{max(k,l)} \quad (6)$$

Therefore, modal estimates extracted from DWT coefficients can be utilized in detecting head/media contact. A typical modal estimate derived using Eq. 6 is plotted in FIG. 6 below indicates head/media contact at the thermal protrusion step #61. ADWT techniques can be advantageous in comparison to Fast Fourier Transform (FFT) techniques. This is due to ADWT's flexible sampling windows and low signal-to-noise ratio processing capabilities. Being able to respond to low signal-to-noise ratio signals can be valuable for heat assisted magnetic recording technology.

Figure 3:
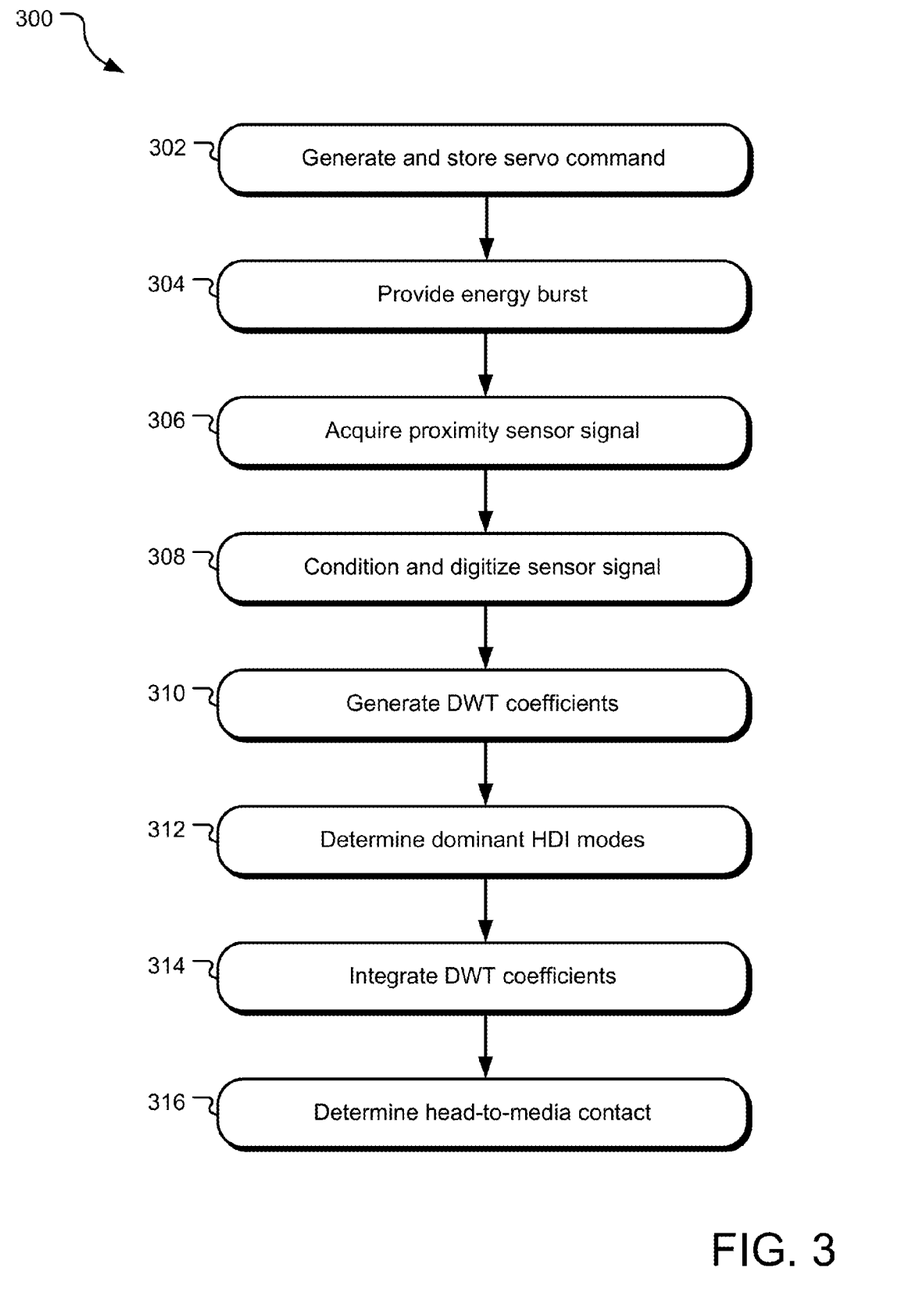
FIG. 3 illustrates example operations for determining head to media contact using an implementation disclosed herein.

FIG. 3 illustrates a flowchart 300 for a method of determining an active fly height setting by determining head-to-media contact. At 302, a command is generated requesting an active fly-height setting measurement, which is received by the servo controller. The command is stored in a memory together with the time stamp when the command is issued. Subsequently, an operation 304 generates an energy burst using a preamplifier and provides the energy burst to the thermal expansion device. Depending on the structure of the thermal expansion device, the energy burst may be in the form of an electrical signal energy burst, an optical energy signal, etc. The energy burst causes the thermal expansion device to move a close point of the transducer head closer to the disc surface.

An operation 306 acquires proximity sensor signals [s(t)] from a proximity sensor configured on the transducer head. In one implementation, the proximity sensor signal may be an analog signal in the form of a change or resistance signal. Alternatively, the proximity sensor signal may be a signal representing a change of speed for the disc, etc. The proximity sensor signal [s(t)] may be communicated to a conditioning circuit and the time stamp of when the proximity sensor signal was collected may be stored in memory. The proximity sensor signal is conditioned and digitized by an operation 308. For example, an ADC module may sample the analog form of the proximity sensor signal at a very high rate to generate digitized form of the proximity sensor signal.

An operation 310 uses the digitized form of the proximity sensor signal to generate DWT coefficients. In one implementation, the DWT coefficients are the actual values of d(k, l) as discussed above with respect to equation 1. An operation 312 analyzes the DWT coefficients to determine dominant HDI modes. An operation 314 integrates the DWT coefficients to generate a modal estimate. An operation 316 uses the modal estimates to determined head-to-media contact. An example of modal estimate indicating head-to-media contact is disclosed in FIG. 6 below.

Figure 4:
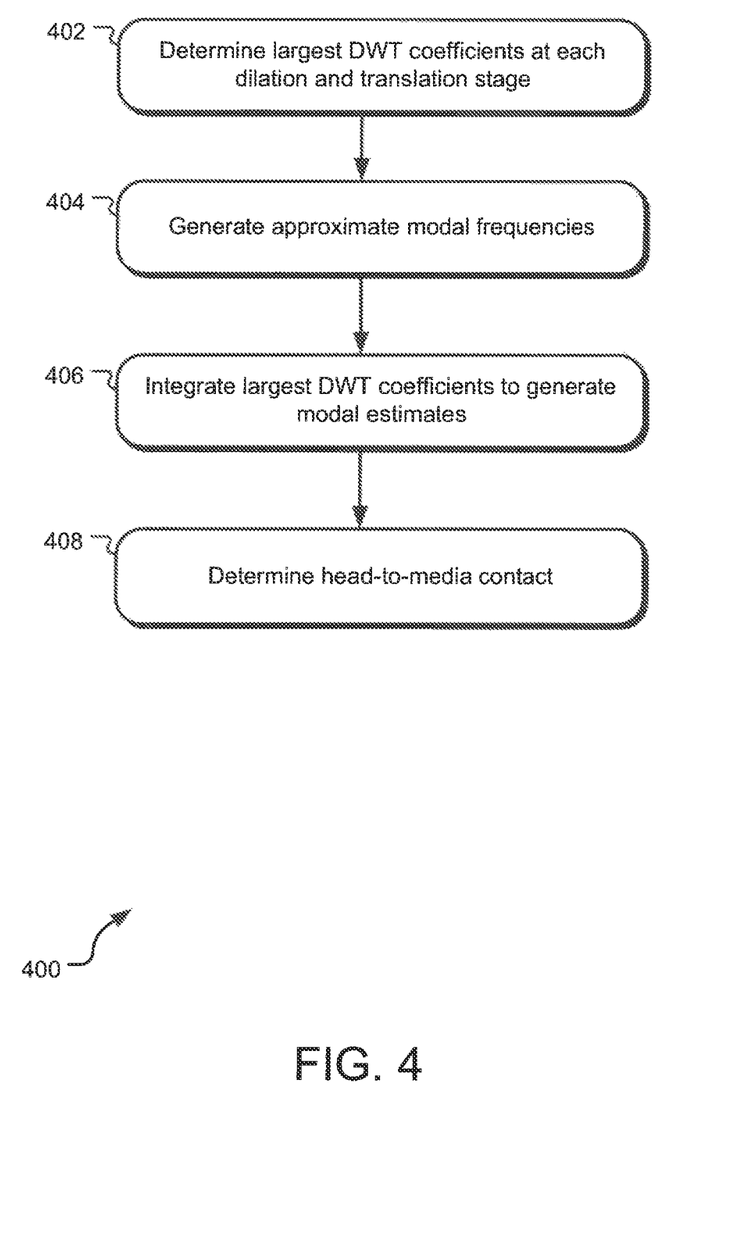
FIG. 4 illustrates example operations for determining dominant HDI modes for a transducer according to an implementation disclosed herein.

FIG. 4 illustrates operations 400 for determining dominant HDI modes for a transducer according to an implementation disclosed herein. An operation 402 determines largest DWT coefficients at each dilation and translation stage as:

$$W_{max(k,l)} = \text{Max } W(a,d)$$

An operation 404 generates approximate modal frequencies $f_{approx}(k, l)$ as:

$$f_{approx,(k,l)} = \frac{I(W_{maxkl})f_{pseudo(l)}}{2\pi N_l}, N_l = 2^k$$

An operation 406 integrates the largest DWT coefficients to generate the modal estimate $\Gamma$ as follows:

$$\Gamma = \sum_{k=1}^{K}\sum_{l=1}^{L} W_{max(k,l)}$$

An operation 408 determines a head to media contact based on the value of the modal estimate $\Gamma$.

Figure 5:
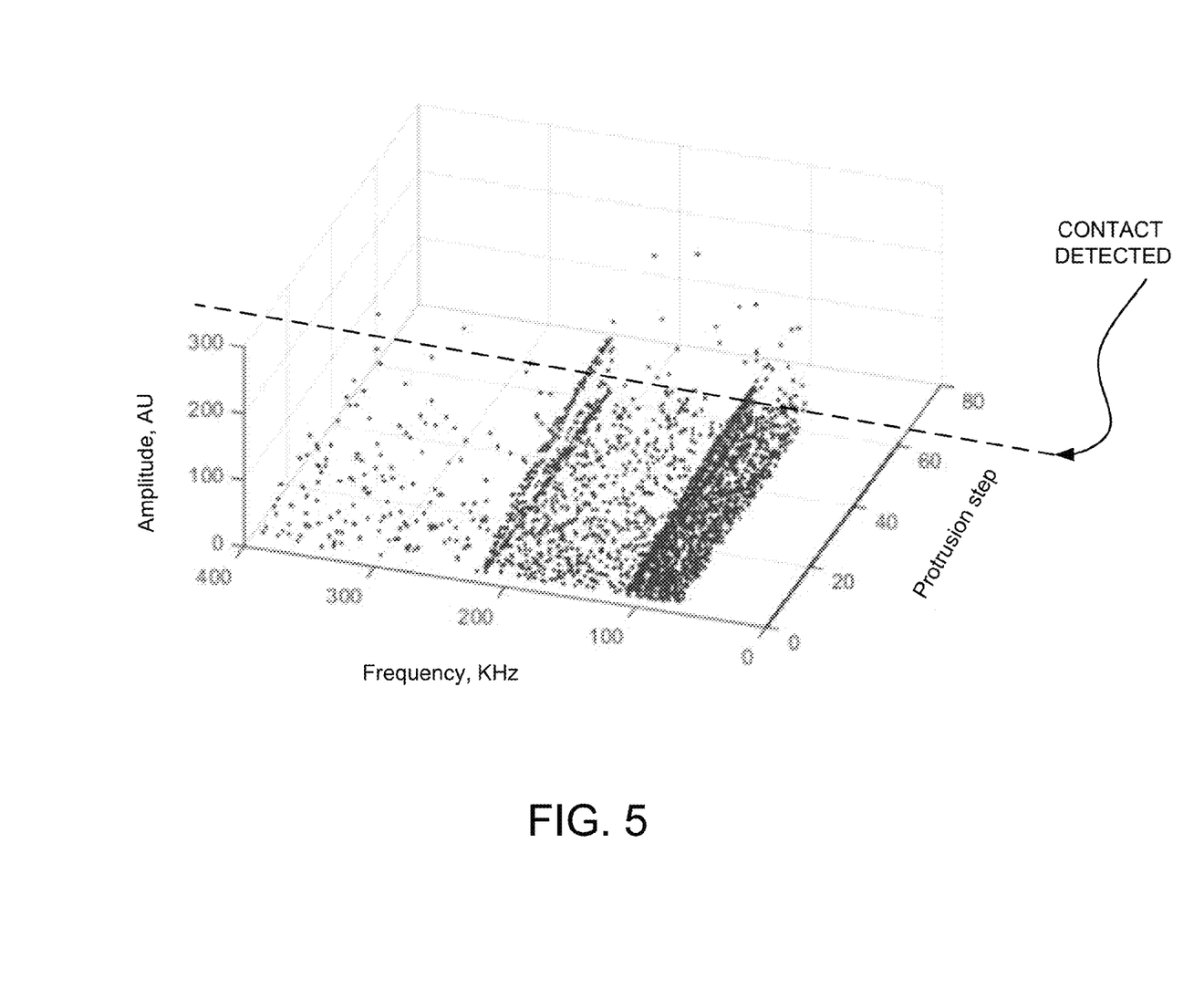
FIG. 5 illustrates an example graph of dominant HDI modes extracted from DWT coefficients versus thermal protrusion steps.

FIG. 5 illustrates a graph 500 of dominant HDI modes extracted from DWT coefficients versus thermal protrusion steps. Specifically, the graph 500 illustrates DWT coefficients at various frequencies for various protrusion steps, wherein the y-axis unit is arbitrary unit (AU), which represents arbitrary amplitudes of the substantially largest DWT coefficients converted into frequencies according to the operation 404.

Figure 6:
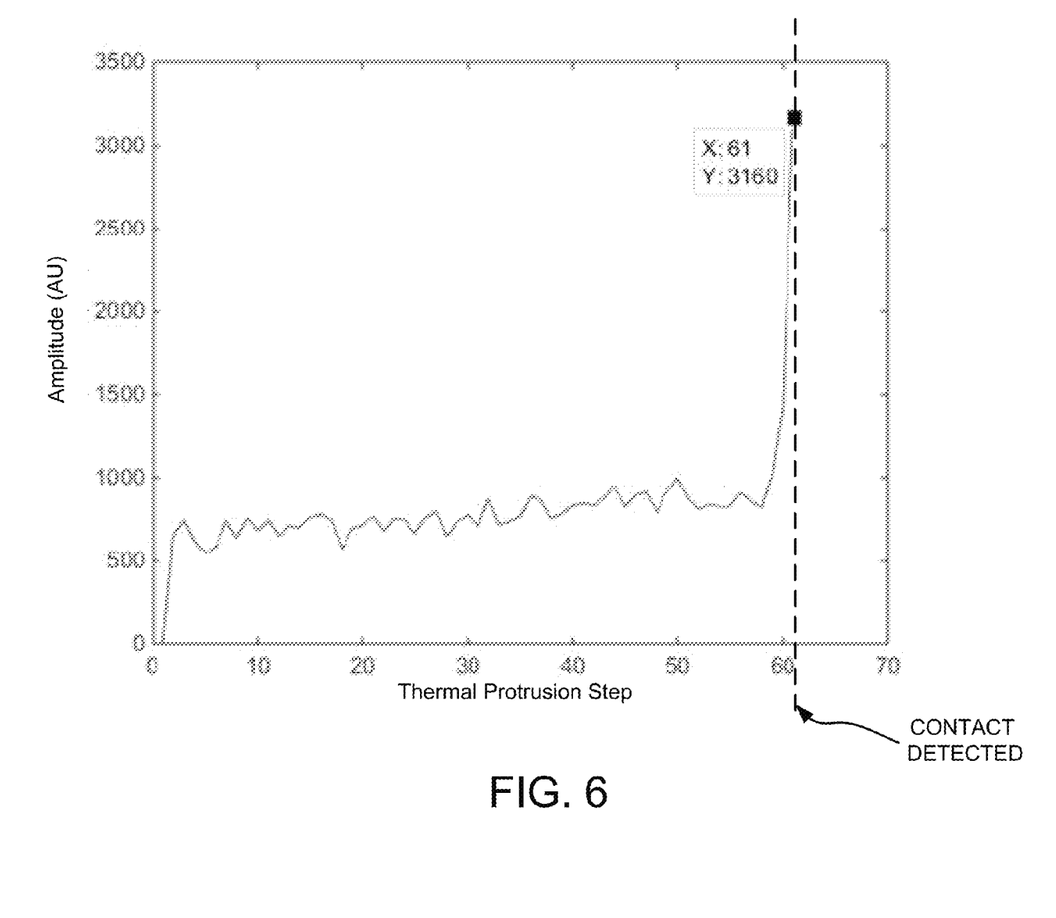
FIG. 6 illustrates an example graph of modal estimates extracted from DWT coefficients versus thermal protrusion steps indicating head to media contact.

FIG. 6 illustrates a graph 600 of modal estimates extracted from DWT coefficients versus thermal protrusion steps indicating head to media contact. Specifically, graph 600 illustrates that for a thermal protrusion step at 61, the amplitude of the modal estimate $\Gamma$ is 3160 and indicates head to media contact. Here the y-axis unit is arbitrary unit (AU), which represents sums of the arbitrary amplitudes of substantially largest DWT coefficients converted into frequencies according to the operation 406.

It is noted that many of the structures, materials, and acts recited herein can be recited as means for performing a function or step for performing a function. Therefore, it should be understood that such language is entitled to cover all such structures, materials, or acts disclosed within this specification and their equivalents, including any matter incorporated by reference.

The apparatuses and methods of implementations described herein will be understood from this specification. While the above description is a complete description of specific implementations, the above description should not be taken as limiting the scope of the patent as defined by the claims.

What is claimed is:

1. A method comprising:
   determining dominant head-disc interference (HDI) modes for a transducer head by:
   analyzing samples of a monitored signal collected from a head-to-media proximity sensor, the samples being analyzed by performing an enhanced discrete wavelet (DWT) transformation on the samples to generate DWT coefficients, the DWT coefficients being generated by iteratively decomposing the monitored signal using a dilation operation and a translation operation;
   determining the largest DWT coefficients at each dilation and translation operation; and
   converting the largest DWT coefficients into approximate modal frequencies.

2. The method of claim 1, further comprising integrating the largest DWT coefficients of each dilation and translation operation to determine modal estimates at various thermal protrusion steps for the transducer head.

3. The method of claim 2, further comprising determining head-to-media contact based on an analysis of the modal estimates.

4. The method of claim 2 further comprising, interpreting the modal estimates according a predetermined criterion to generate HDI modal data, wherein the predetermined criterion is based on at least one of head-to-media proximity signature and lube interaction.

5. The method of claim 4, further comprising determining correction actions based on the HDI modal data, wherein the corrections actions comprising one or more of adjusting fly-height, cleaning transducer head clean up, and predicting transducer failure.

6. A storage device comprising:
   a transducer head;
   a disc;
   a processor configured to determine dominant head-disc interference (HDI) modes for a transducer head by:
   analyzing samples of a monitored signal collected from a head-to-media proximity sensor, the samples being analyzed by performing an enhanced discrete wavelet (DWT) transformation on the samples to generate DWT coefficients, the DWT coefficients being generated by iteratively decomposing the monitored signal using a dilation operation and a translation operation;
   determining the largest DWT coefficients at each dilation and translation operation; and
   converting the largest DWT coefficients into approximate modal frequencies.

7. The storage device of claim 6 wherein the processor is further configured to integrate the largest DWT coefficients of each dilation and translation operation to determine modal estimates at various thermal protrusion steps for the transducer head.

8. The storage device of claim 7 wherein the processor is further configured to determine head-to-media contact based on an analysis of the modal estimates.

9. The storage device of claim 7 wherein the processor is further configured to interpret the modal estimates according a predetermined criterion to generate HDI modal data, wherein the predetermined criterion is based on at least one of head-to-media proximity signature and lube interaction.

10. The storage device of claim 9 wherein the processor is further configured to determine an adjustment to the fly-height based on the HDI modal data.

11. The storage device of claim 9 wherein the processor is configured to predict transducer failure based on the HDI modal data.

12. A storage device comprising:
   a disc;
   a transducer head;
   a thermal expansion device disposed proximate the transducer head;
   a proximity sensor configured to output analog data signals;
   a digitizer configured to convert the analog data signals from the proximity sensor to digitized sample data;
   a discrete wavelet transformation (DWT) module configured to analyze the digitized sample data by performing an enhanced DWT on the digitized sample data to generate DWT coefficients; and
   a modal filter configured to determine dominant head-disc interference (HDI) modes for a transducer head by analyzing the DWT coefficients.

13. The storage device of claim 12, wherein the modal filter is further configured to determine the dominant HDI modes by determining largest DWT coefficients at each dilation and translation operation and converting the largest DWT coefficients into approximate modal frequencies.

14. The storage device of claim 13, wherein the modal filter is further configured to integrate the largest DWT coefficients of each dilation and translation operation to determine modal estimates at various thermal protrusion steps for the transducer head.

* * * * *